US006901791B1

(12) United States Patent
Frenz et al.

(10) Patent No.: US 6,901,791 B1
(45) Date of Patent: Jun. 7, 2005

(54) METHOD AND DEVICE FOR DIAGNOSING OF A FUEL SUPPLY SYSTEM

(75) Inventors: Thomas Frenz, Noerdlingen (DE); Hansjoerg Bochum, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 10/110,979

(22) PCT Filed: Oct. 7, 2000

(86) PCT No.: PCT/DE00/03531

§ 371 (c)(1), (2), (4) Date: May 9, 2002

(87) PCT Pub. No.: WO01/29411

PCT Pub. Date: Apr. 26, 2001

(30) Foreign Application Priority Data

Oct. 19, 1999 (DE) ........................................ 199 50 222

(51) Int. Cl.[7] .............................................. G01M 15/00
(52) U.S. Cl. ..................................................... 73/119 A
(58) Field of Search ............................ 73/118.1, 119 A, 73/862.191, 862.333; 123/381; 701/111

(56) References Cited

U.S. PATENT DOCUMENTS 5,445,019 A 8/1995 Chui et al.
5,499,538 A 3/1996 Glidewell et al.

FOREIGN PATENT DOCUMENTS

| | | |
|---|---|---|
| DE | 195 20 300 | 12/1996 |
| DE | 195 48 279 | 4/1997 |
| WO | WO 99 45261 | 9/1999 |

*Primary Examiner*—Evan Pert
*Assistant Examiner*—Monica D. Harrison
(74) *Attorney, Agent, or Firm*—Walter Ottesen

(57) ABSTRACT

The invention relates to a method and an arrangement for diagnosing a fuel supply system of an internal combustion engine. In order to make possible a differentiation of the fault with respect to individual components of the fuel supply system, a method is suggested which is characterized by the following steps: recording the trace of the fuel pressure in the fuel supply system (2); forming the frequency spectrum of the fuel supply trace (3); and, analyzing the frequency spectrum (4). The analysis of the frequency spectrum preferably includes the following steps: comparing the trace of the recorded frequency spectrum to the trace of the frequency spectrum of a fault-free operating fuel supply system at this operating point; and, in the event that deviations between the traces of the frequency spectra are present, classifying the deviations in accordance with the nature of the faults in the fuel supply system via which the deviations are caused.

8 Claims, 3 Drawing Sheets

METHOD AND DEVICE FOR DIAGNOSING OF A FUEL SUPPLY SYSTEM

FIELD OF THE INVENTION

The present invention relates to a method and an arrangement for diagnosing a fuel supply system of an internal combustion engine.

BACKGROUND OF THE INVENTION

A fuel supply system of an internal combustion engine functions to supply the engine with fuel from a fuel tank. The fuel is pumped by a fuel pump out of the fuel tank via a pressure line to a fuel distributor having injection valves. The fuel distributor is located on the engine. A pressure sensor is usually mounted on the fuel distributor or at another location in the fuel supply system. With the pressure sensor, the fuel pressure in the fuel supply system is measured and transmitted to a control. The control maintains the pressure in the fuel supply system, especially in the fuel distributor, at a pregiven value. The fuel quantity, which is not needed by the engine, is usually returned to the fuel tank via a return line.

The fuel supply system can be configured as a high-pressure fuel supply system, especially a common-rail storage injection system for a direct-injecting engine wherein a fuel high-pressure store is provided as a fuel distributor. In common-rail storage injection systems, fuel is first supplied from the fuel tank to a downstream high-pressure pump via a presupply pump configured as an electric fuel pump. The high-pressure supply pump pumps the fuel at a very high pressure into the fuel high-pressure store and from there, the fuel reaches a combustion chamber of the engine via the injection valves configured as injectors. Pressure sensors are mounted in the fuel high-pressure store in order to measure the fuel pressure in the fuel high-pressure store for the control of the fuel pressure. One such fuel supply system is known, for example, from U.S Pat. No. 5,878,718.

From the state of the art, it is known to derive a defect of the fuel supply system from a control deviation of the control of the fuel pressure in the fuel supply system. A differentiated diagnosis of the fault with respect to individual components of the fuel supply system is not possible. It would, however, be desirable to be able to diagnose especially a fault of the fuel pump of the fuel supply system. A defective fuel pump can lead to the condition that the requested fuel pressure in the fuel supply system can no longer be reached and this, in turn, can lead to exhaust-gas relevant and power-relevant faults in the mixture formation at specific operating points of the engine.

SUMMARY OF THE INVENTION

For this reason, it is a task of the present invention to make possible a differentiated diagnosis of a fault of the fuel supply system.

To solve this task, the invention proposes a method which proceeds from the method for diagnosing a fuel supply system of the kind mentioned initially herein which is characterized by the following steps:

- recording the trace of the fuel pressure in the fuel supply system;
- forming the frequency spectrum of the fuel supply trace; and,
- analyzing the frequency spectrum.

The trace of the fuel pressure in the fuel supply system can, for example, be determined on the basis of a physical model of the fuel supply system. For this purpose, condition variables of the fuel supply system and/or of the internal combustion engine are supplied to the physical model from which the trace of the fuel pressure is modeled.

Advantageously, the fuel pressure in the fuel supply system is measured by means of a pressure sensor. Such a pressure sensor is usually already present in the fuel supply system for detecting the fuel pressure for a control of the fuel pressure in the fuel supply system and can also be applied for recording the fuel pressure trace in accordance with the present invention.

The frequency spectrum of the fuel pressure trace is formed for the diagnosis. The frequency spectrum is advantageously formed by means of a Fourier transformation of the fuel pressure trace. Because of the operation of the fuel pump in the fuel supply system, a characteristic frequency spectrum of the fuel pressure trace is obtained. The frequency spectrum is analyzed for a differentiated diagnosis of a fault of the fuel supply system.

In detail, the frequency spectrum of the fuel pressure trace in a fault-free fuel supply system has a trace characteristic for the particular fuel supply system. Specific faults of the fuel supply system change the characteristic trace of the frequency spectrum in a specific manner. These changes of the characteristic trace are detected in the context of the analysis of the frequency spectrum and a conclusion is drawn from the changes as to the causing fault. The frequency spectrum is, for example, compared to threshold values to detect the changes of the characteristic trace. An increase or a drop of the amplitude of the frequency spectrum can be detected via a comparison to the corresponding amplitude threshold values. Likewise, a displacement of characteristic frequency components to higher or lower frequencies can be detected via a comparison with corresponding frequency threshold values. The coupling of a specific change of the characteristic trace of the frequency spectrum with the causing fault can, for example, take place by means of a knowledge based system. In this way, a differentiated diagnosis of a fault of the fuel supply system is possible with the method according to the invention.

According to an advantageous embodiment of the present invention, the analysis of the frequency spectrum includes the following steps:

- comparison of the trace of the recorded frequency spectrum to the trace of the frequency spectrum of a fault-free operating fuel supply system; and,
- if deviations between the traces of the frequency spectra are present, classifying the deviations in accordance with the nature of the faults in the fuel supply system by which the deviations are caused.

Specific faults of the fuel supply system change the characteristic trace of the frequency spectrum of the fuel pressure trace in a defined manner. Thus, especially a fault of the fuel pump of the fuel supply system can be diagnosed and, for a multi-cylinder fuel pump, a fault in one of the pump cylinders can be diagnosed from the trace of the recorded frequency spectrum. The trace of the recorded frequency spectrum is, preferably, compared to the trace of the frequency spectrum of a fuel supply system which operates without fault at this operating point.

According to a preferred embodiment of the present invention, the relevance of the deviations is evaluated before classifying the deviations according to the nature of the fault. Slight deviations of the characteristic trace of the frequency spectrum, which can have their origin in temperature fluctuations or in tolerances of the fuel supply system, thereby remain unconsidered. Only such deviations, which are evaluated as relevant, are considered in the diagnosis of the fuel supply system.

According to an advantageous further embodiment of the present invention, a suggestion is made for a fuel supply system wherein an n-cylinder fuel pump having a specific base frequency is arranged, that the deviation is classified as being caused by a fault in the fuel pump when there is a drop of the amplitude of the frequency component of the n-multiple base frequency of the fuel pump. Pressure pulsations having the n-multiple base frequency of a work cycle arise during the operation of the fuel pump in an n-cylinder fuel pump, especially for an n-cylinder high pressure supply pump of a common-rail storage injection system of a direct-injecting internal combustion engine. A frequency component in the n-multiple base frequency of the fuel pump can clearly be recognized in the trace of the frequency spectrum via the recordation of the trace of the fuel pressure and the formation of the frequency spectrum of the fuel pressure trace. If the amplitude of the frequency component of the n-multiple base frequency of the fuel pump drops, this is a reliable indication for the presence of a fault of the fuel pump. With an evaluation of the frequency spectrum in the n-multiple base frequency of the fuel pump, a differentiated diagnosis of faults of the fuel supply system can thereby be carried out with the objective that one can distinguish between faults of the fuel pump and other faults of the fuel supply system.

According to a further preferred embodiment of the present invention, it is suggested that, for an increase of the amplitude of the frequency component of the 1-multiple base frequency of the fuel pump, the deviation is classified as caused by a fault of one of the pump cylinders of the fuel pump. In the characteristic trace of the frequency spectrum of a fault-free operating fuel supply system, only a frequency component having a relatively low amplitude can be recognized in the base frequency of the fuel pump. If, in addition to a drop of the amplitude of the frequency component in the n-multiple base frequency of the fuel pump, the frequency component in the base frequency of the fuel pump increases, then this is a reliable indication that a fault of one of the pump cylinders of the fuel pump is present.

Advantageously, the reduction or the increase of the amplitude of the frequency component is determined on the basis of amplitude thresholds, that is, if there is a drop below the amplitude threshold or if the amplitude threshold is exceeded. The amplitude threshold values are usually dependent upon the load and the rpm of the fuel pump of the fuel supply system; that is, the analysis of the frequency spectrum should be carried out in dependence upon load as well as in dependence upon rpm. In accordance with another preferred embodiment of the present invention, the mean value of the recorded fuel pressure is subtracted in advance of the analysis of the frequency spectrum in order to avoid an equal component in the recorded frequency spectrum.

As a further solution of the present task and proceeding from the arrangement for diagnosing a fuel supply system of the type mentioned initially herein, the invention suggests that the arrangement includes means for carrying out the method of the invention.

BRIEF DESCRIPTION OF THE DRAWINGS

A preferred embodiment of the present invention is explained in greater detail in the following with respect to the drawings wherein.

DESCRIPTION OF THE PREFERRED EMBODIMENTS OF THE INVENTION

The present invention relates to a method for diagnosing a fuel supply system of an internal combustion engine. When there are faults in the fuel supply system, the method according to the invention permits a differentiation of the fault with respect to individual components of the fuel supply system. With the method of the invention, a fault of a fuel pump of the fuel supply system can especially be diagnosed.

The fuel supply system wherein the method of the invention is utilized is preferably configured as a common-rail storage injection system of a direct-injecting internal combustion engine. In common-rail storage injection systems, fuel is first supplied by a presupply pump from a fuel tank to a downstream high-pressure supply pump. The presupply pump is configured as an electric fuel pump. The high-pressure supply pump pumps the fuel at a very high pressure into a fuel high-pressure store from where the fuel reaches a combustion chamber of the engine via injectors. The fuel quantity, which is not needed by the engine, usually flows through the fuel high-pressure store via a return line back into the fuel tank. A high-pressure sensor is mounted in the fuel high-pressure store and this sensor measures the fuel pressure in the fuel high-pressure store and supplies the same to a high-pressure control which controls the fuel pressure in the fuel high-pressure store to a pregiven value.

Figure 1:
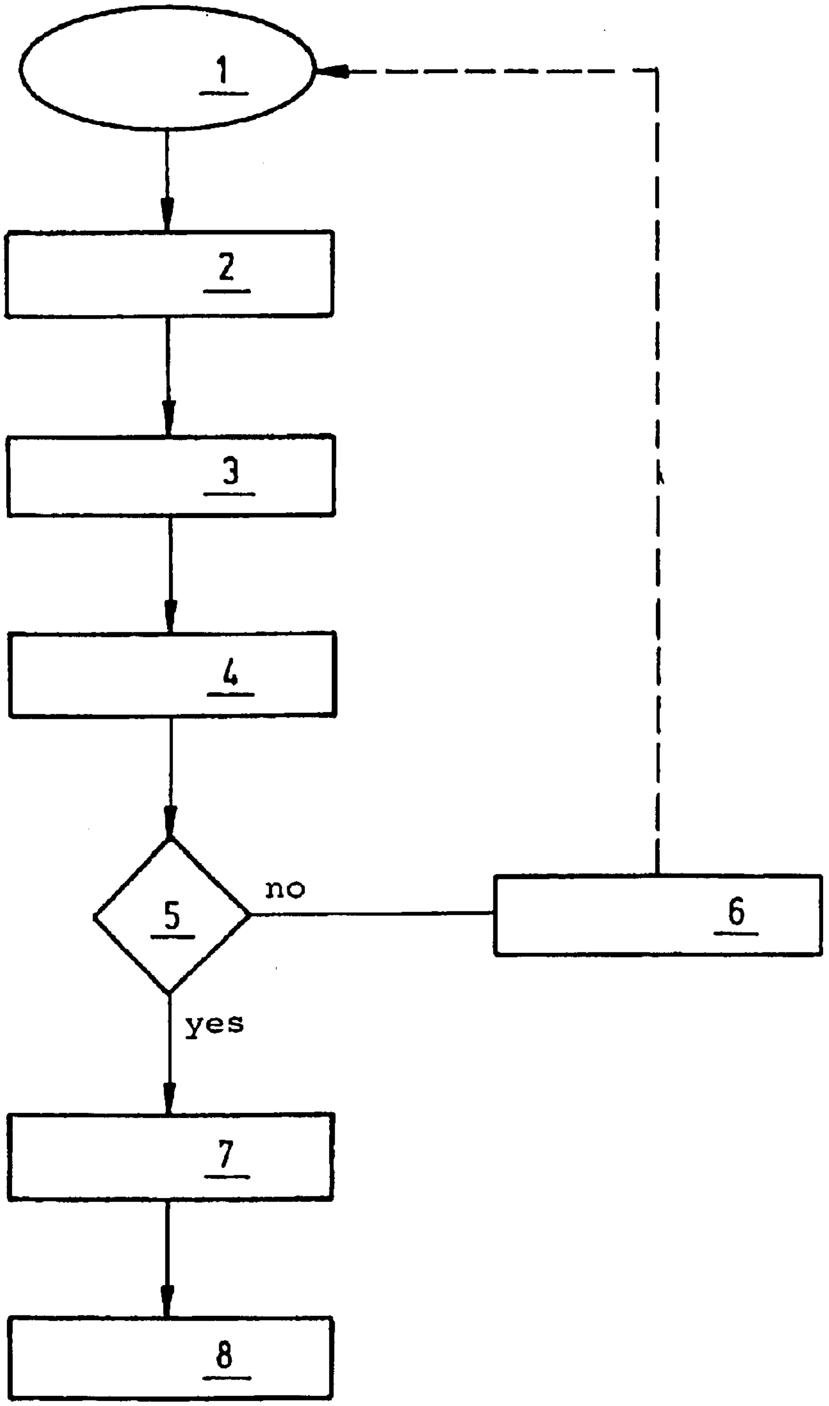
FIG. 1 is a flowchart of a method according to the invention in accordance with a preferred embodiment.

The method of the invention is started in a function block 1 in FIG. 1. First, the fuel pressure, which is present in the fuel high-pressure store, is measured in a function block 2 by means of the high-pressure sensor. The recordation of the trace of the fuel pressure can take place continuously, at regular time points, or at selected time points.

The frequency spectrum of the measured fuel pressure trace is formed in a function block 3. The frequency spectrum is, for example, formed by means of a Fourier transformation. Thereafter, the frequency spectrum is analyzed. For this purpose, the frequency component of the n-multiple base frequency of the fuel pump is compared to an rpm-dependent amplitude threshold value in a function block 4. Furthermore, the frequency component of the base frequency of the fuel pump is compared to an additional rpm-dependent amplitude threshold value.

In detail, and in the present embodiment, a diagnosis of the common-rail storage injection system is carried out wherein a 3-cylinder high-pressure supply pump operates. When utilizing the 3-cylinder high-pressure supply pump, pressure pulsations occur at 3 times the base frequency of a work cycle. The pressure pulsations can be detected in the frequency spectrum of the fuel pressure trace at the 3-multiple base frequency of the high-pressure supply pump from a frequency component having a large amplitude. A fault of the high-pressure supply pump leads to a reduction of the amplitude of this frequency component, which is determined. Furthermore, a fault of one of the pump cylinders of the high-pressure supply pump leads additionally to an increase of the amplitude of the frequency component at the base frequency of the high-pressure supply pump.

The reduction or the increase of the amplitudes of these frequency components can be determined based on amplitude thresholds for which there is a drop thereblow or which are exceeded. For this purpose, a check is made in an inquiry block 5 as to whether the trace of the frequency spectrum for the 1-multiple or the 3-multiple base frequency of the high-pressure supply pump is above or below a pregiven amplitude threshold. In the case of the negative, the high-pressure supply pump is ok (function block 6) and the method of the invention returns to function block 1. The broken line between the function block 6 and the function block 1 indicates that the method according to the present invention is not continuous, but is called up cyclically or triggered.

In the event that the frequency spectrum of the recorded fuel pressure trace exhibits deviations which drop below the pregiven amplitude thresholds or exceed the amplitude thresholds for the 1-multiple or 3-multiple base frequency of the high-pressure supply pump, then the high-pressure pump is defective (function block 7). A fault memory is then set in function block 8.

Figure 2:
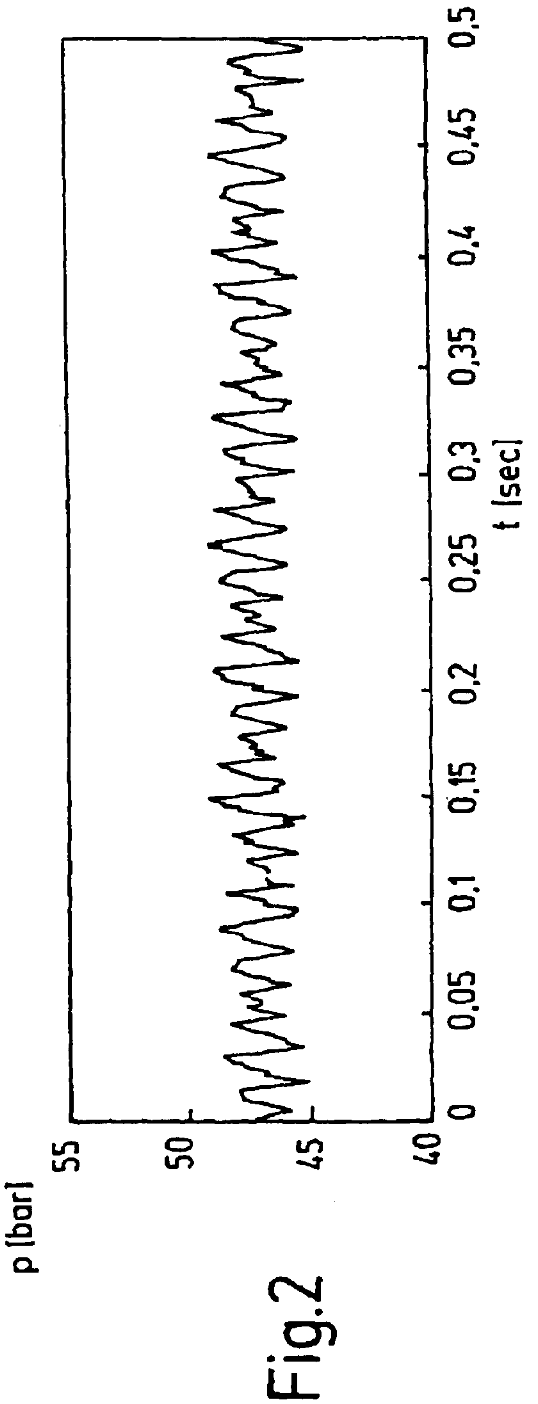
FIG. 2 shows the trace of the recorded fuel pressure.

In FIG. 2, the measured trace of the fuel pressure in the fuel high-pressure store is shown over a time span of 0.5 seconds. The fuel pressure was measured at a rotational speed of the engine of 2080 rpm. The base frequency of the work cycle of the 3-cylinder high-pressure supply pump of the common-rail storage injection system is 17.3 Hz.

Figure 3:
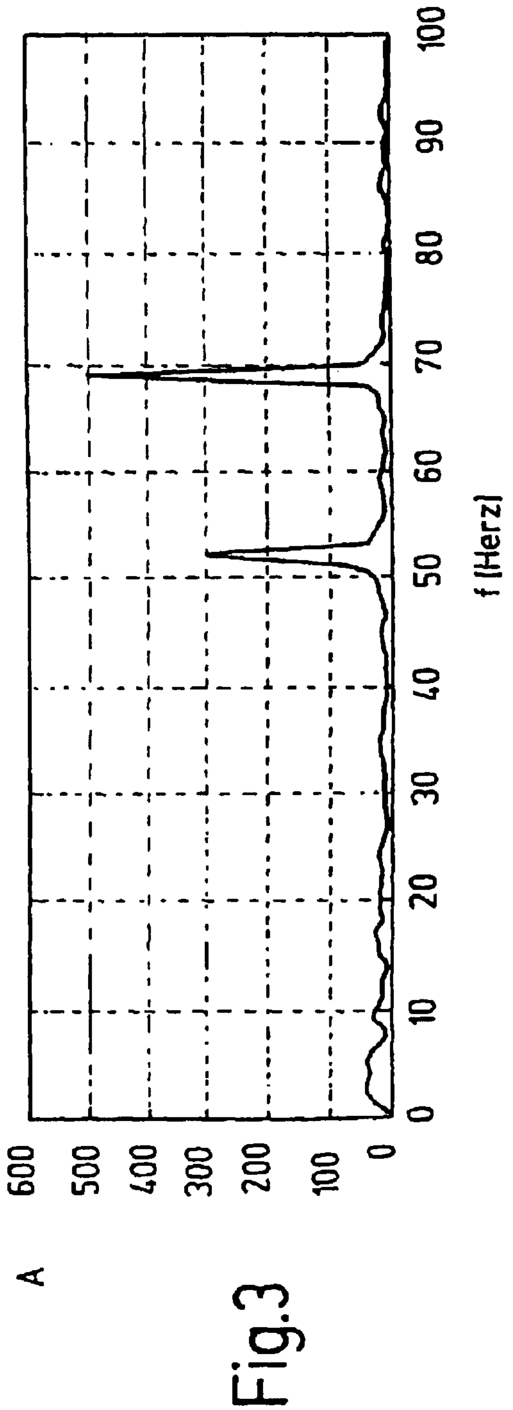
FIG. 3 shows the trace of the frequency spectrum of a fuel supply system operating fault-free; and, FIG. 4 shows the trace of the frequency spectrum of a fuel supply system wherein a defective fuel pump operates.

FIG. 3 shows the frequency spectrum of the measured fuel pressure trace of FIG. 2. The frequency component of the high frequency supply pump having a 3-multiple base frequency (52 Hz) and the frequency component of the injections (4-cylinder engine, 69 Hz) are easily recognized. No pronounced frequency component can be recognized for the 1-multiple base frequency (17.3 Hz).

Figure 4:
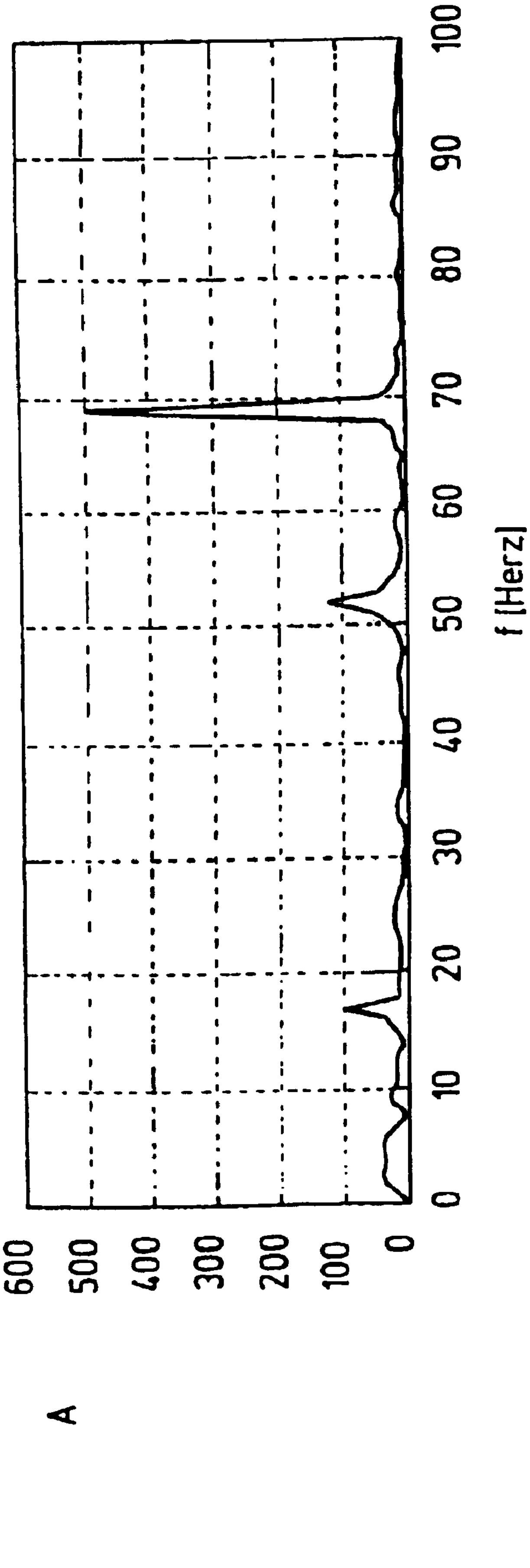

In FIG. 4, the frequency spectrum of the measured fuel pressure is shown for a defective high-pressure supply pump. The efficiency of the fuel pump drops because of the defective high-pressure supply pump and this leads to a reduction of the amplitude of the frequency component for the 3-multiple base frequency. The amplitude has dropped from barely 300 (FIG. 3) to approximately 120 (FIG. 4). If only an individual pump cylinder of the high-pressure supply pump is defective, the amplitude of the frequency component of the 3-multiple base frequency likewise drops. Additionally, a frequency component at the 1-multiple base frequency of the high-pressure supply pump is added to the frequency spectrum. The amplitude of this frequency component increased from approximately 20 (FIG. 3) to over 100 (FIG. 4).

What is claimed is:

1. A method for diagnosing a fuel supply system of an internal combustion engine, the fuel supply system including an n-cylinder fuel pump arranged therein and said n-cylinder fuel pump having a specific base frequency, the method comprising the steps of:

recording a first trace of the fuel pressure in said fuel supply system;

forming a frequency spectrum of said first trace of said fuel pressure with said frequency spectrum including a frequency component of an n-multiple base frequency of said n-cylinder fuel pump;

comparing said first trace to a second trace of a fault-free operating fuel supply system to determine a deviation therebetween; and, when there is a drop off of the amplitude of said frequency component and a deviation occurs, classifying said deviation as being caused by a fault of said fuel pump.

2. The method of claim 1, comprising the further step of measuring said fuel pressure in said fuel supply system utilizing a pressure sensor.

3. The method of claim 1, comprising the further step of evaluating the relevance of said deviation in advance of classifying said deviation in accordance with the nature of the fault.

4. The method of claim 1, forming said frequency spectrum by utilizing a Fourier transformation.

5. The method of claim 1, classifying said deviation as caused by a fault of a pump cylinder of said fuel pump when the amplitude of said frequency component of a 1-multiple of said base frequency of said fuel pump increases.

6. The method of claim 1, wherein the drop off or increase of the amplitude of said frequency component is determined on the basis of amplitude thresholds which are exceeded or for which there is a drop therebelow.

7. The method of claim 1, comprising the further step of subtracting the mean value of the recorded fuel pressure in advance of the analysis of said frequency spectrum.

8. An arrangement for diagnosing a fuel supply system of an internal combustion engine, the fuel supply system including an n-cylinder fuel pump arranged therein and said n-cylinder pump having a specific base frequency, the arrangement comprising:

means for recording a first trace of the fuel pressure in said fuel supply system;

means for forming a frequency spectrum of said trace of said fuel pressure with said frequency spectrum including a frequency component of an n-multiple base frequency of said n-cylinder fuel pump;

means for comparing said first trace to a second trace of a fault-free operating fuel supply system to determine a deviation therebetween; and, means for classifying said deviation as being caused by a fault of said fuel pump when there is a drop off of the amplitude of said frequency component and said deviation occurs.

* * * * *